US008793212B2

(12) United States Patent
McGuire

(10) Patent No.: US 8,793,212 B2
(45) Date of Patent: Jul. 29, 2014

(54) METHODS AND SYSTEMS OF EFFECTIVELY MANAGING UV EXPOSURE

(75) Inventor: Kevin McGuire, Rochester, NY (US)

(73) Assignee: UV Technologies, LLC, Fort Myers, FL (US)

(*) Notice: Subject to any disclaimer, the term of this patent is extended or adjusted under 35 U.S.C. 154(b) by 790 days.

(21) Appl. No.: 13/019,013

(22) Filed: Feb. 1, 2011

(65) Prior Publication Data

US 2011/0191272 A1 Aug. 4, 2011

Related U.S. Application Data

(60) Provisional application No. 61/300,681, filed on Feb. 2, 2010.

(51) Int. Cl.
G06F 15/00 (2006.01)
G06F 15/18 (2006.01)

(52) U.S. Cl.
USPC .......................................................... 706/62

(58) Field of Classification Search
None
See application file for complete search history.

(56) References Cited

U.S. PATENT DOCUMENTS

| 5,036,311 | A * | 7/1991 | Moran et al. ................... 340/600 |
| 5,365,068 | A * | 11/1994 | Dickerson ..................... 250/372 |
| 7,033,577 | B2 | 4/2006 | Dueva-Koganov et al. |
| 2004/0149921 | A1 * | 8/2004 | Smyk ........................... 250/372 |
| 2007/0073487 | A1 * | 3/2007 | Albright et al. .................... 702/3 |
| 2008/0297767 | A1 * | 12/2008 | Goren et al. ..................... 356/51 |
| 2009/0147215 | A1 * | 6/2009 | Howell et al. ................ 351/158 |

OTHER PUBLICATIONS mplayit iPhone Arcade iTan!; Facebook Website; Jan. 11, 2010; http://apps.facebook.com/iphonearcade/?iTan.
iPhone Apps—tTan; Apptism Website; Jan. 11, 2010; http://www.apptism.com/apps/itan.
Tan Safe—tan securely!; TanSafe Website; Jan. 11, 2010; http://tansafe.leosh.com/?lang=en.
Sun Alert for iPhone; Welcome to Orlin's place Website; Jan. 11, 2010; www.orlinkolev.net/iphone/sunalert/Sun_alert_for_iPhone.html.
ITAN; iTunes Website; Jan. 11, 2010; itunes.com.

* cited by examiner

*Primary Examiner* — Kakali Chaki
*Assistant Examiner* — Peter Coughlan
(74) *Attorney, Agent, or Firm* — Hiscock & Barclay, LLP

(57) ABSTRACT

A system for managing a user's exposure to the ultraviolet radiation including a user input interface, display circuitry including a screen, control circuitry including at least one processor wherein the control circuitry is configured to communicate with the display circuitry and the user input interface, data storage means for storing program instructions that, when implemented by the control circuitry, are configured to determine UV index information corresponding to a user's location, communicate with the user input interface to retrieve information for at least one user parameter, calculate at least one recommended exposure time based on the UV index information and the user parameter information, and communicate with the display circuitry to display the recommended exposure time.

19 Claims, 4 Drawing Sheets

METHODS AND SYSTEMS OF EFFECTIVELY MANAGING UV EXPOSURE

CROSS-REFERENCE TO RELATED APPLICATIONS

This application claims the benefit of U.S. Provisional Patent Application No. 61/300,681, filed on Feb. 2, 2010, which is fully incorporated herein by reference.

TECHNICAL FIELD

The present invention relates to a system of managing a user's exposure to ultraviolet (UV) light emitted by the sun as well as production of vitamin D due to UV exposure, and, more particularly, to a method of implementing the system preferably on an electronic device electronic device optionally including wireless connectivity to the internet for transmitting and receiving data and a Global Positioning System (GPS) for determining a user's location.

BACKGROUND INFORMATION

Generally, light of wavelength in the range of 10 nanometers (nm) to 400 (nm) is considered ultraviolet and several sub-ranges of ultraviolet light are often referred to including UVA (generally, 315 nm-400 nm) and UVB (generally, 280 nm-315 nm), for example. The spectrum of solar irradiance, while also including light in the visible and infrared ranges, includes light in the ultraviolet range and specifically in the UVA and UVB ranges. While the vast majority of ultraviolet radiation emitted by the sun never reaches the Earth's surface due to the Earth's atmosphere, the small percentage of light in the ultraviolet range that does reach the Earth's surface has a significant impact on human life.

Exposure to UV radiation from the sun can have both harmful and beneficial effects on the human body. One of the more visible effects on the human body of exposure to UV light is a change in skin pigmentation and resulting color. Melanin, a brown pigment in the skin, increases in concentration when exposed to UV light in order to absorb UV radiation and dissipate the associated energy. Melanin production is a defensive mechanism which, depending on exposure level, can make the skin more resistant to sunburns. However, insufficient melanin production can result in DNA damage leading to skin cancers such as melanoma, as is commonly known. It has also been shown that melanin production does not decrease the harmful effects of UVA which is most commonly attributed to skin aging and damage leading to skin cancers.

Mitigating techniques such as sunscreens, sun blocks, creams, lotions, and/sprays have been developed and are increasingly effective at filtering UV light before it contacts skin cells by absorbing and/or reflecting radiation in both the UVA and UVB ranges. Sunscreens generally have a sun protection factor (SPF) indicating the level of protection against UV, and particularly UVB, light. For example, application of a sunscreen having an SPF of 15 will only cause the skin to exhibit erythema, or a reddening or burning of the skin, when exposed to 15 times the radiation that would otherwise cause the skin to burn. While UVA radiation is less likely to cause erythema, it has been found to cause DNA damage at a deeper level within the skin. Accordingly, several sunscreens containing zinc oxide and/or titanium dioxide, for example, have been developed to effectively block UVA radiation. In order to provide a relative scale, the persistent pigment darkening (PPD) and protection factor A (PFA) methods have been developed, such as that taught, for example, by U.S. Pat. No. 7,033,577, incorporated herein by reference, to indicate levels of protection against UVA radiation.

While too much exposure to UV light can be harmful, too little exposure can also have detrimental effects. For example, UV light, and particularly light in the UVB range, induces the production of vitamin D in the skin. Vitamin D has immunological and cardiovascular effects, among others, and therefore increased health of the human body requires that its concentration and production be appropriately regulated.

While suggested daily exposures of UV radiation can be retrieved from sources such as the World Health Organization and the U.S. Environmental Protection Agency, generally in the form of a UV index, several personal, environmental, and geographical factors, among others, effect any determination of a person's recommended daily exposure. Accordingly, there is a need for a system to assist a user in effectively managing UV exposure, daily and/or over an extended period of time in order to receive a more balanced and healthy amount of both UVA and UVB radiation.

BRIEF DESCRIPTION OF THE DRAWINGS

The present invention is disclosed with reference to the accompanying drawings, wherein.

DETAILED DESCRIPTION

Figure 1:
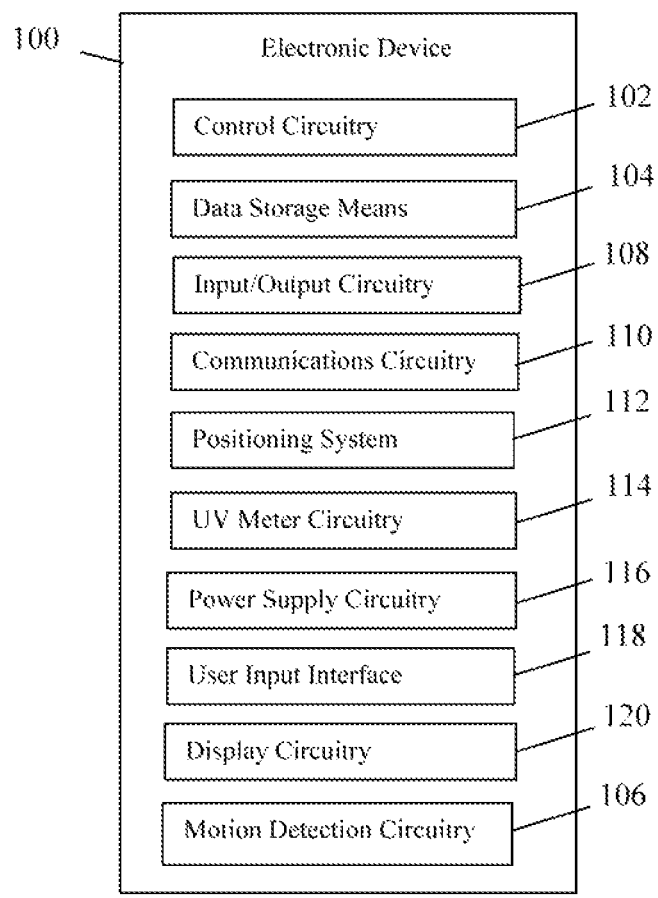
FIG. 1 is a schematic view of an illustrative electronic device for providing an application operative to assist a user in managing UV exposure.

FIG. 1 is a schematic view of an illustrative electronic device for providing an application operative to assist a user in managing UV exposure in accordance with some embodiments of the invention. Electronic device 100 can include control circuitry 102, data storage means 104, I/O circuitry 108, communications circuitry 110, such as a network interface, a power supply 116, such as a battery or kinetics, a user input interface 118, and a display circuitry 120. Optional components further include a positioning system 112, such as GPS circuitry and associated receiver, and UV meter circuitry 114. In some embodiments, one or more of the components of electronic device 100 can be combined or omitted and in some embodiments, electronic device 100 can include other components not combined or included in those shown in FIG. 1 (e.g., motion detection components and imaging components), or several instances of the components shown in FIG. 1. Accordingly, for the sake of simplicity, only one of each of the components is shown in FIG. 1.

Electronic device 100 can include any suitable type of electronic device. For example, electronic device 100 can include a portable electronic device that the user may hold in his or her hand, such as a digital media player (e.g., an iPod™ made available by Apple Inc. of Cupertino, Calif.), a personal e-mail device (e.g., a Blackberry™ made available by Research in Motion of Waterloo, Ontario), a personal data assistant ("PDA"), a cellular telephone (e.g., an iPhone™ made available by Apple Inc. of Cupertino, Calif.), a handheld gaming device, a table computer (e.g., an iPad™ made available by Apple Inc. of Cupertino, Calif.) and a digital camera. As another example, electronic device 100 can include a larger portable electronic device, such as a laptop computer.

Control circuitry 102 can include, for example, any processing circuitry or processor operative to control the operations and performance of the electronic device 100. For example, control circuitry 102 can be used to run operating system applications, firmware applications, media playback applications, media editing applications, or any other application.

Data storage means 104 can include, for example, memory, semi-permanent memory such as random access memory (RAM), one or more storage mediums including a hard-drive, solid state drive, flash memory, permanent memory such as ROM, any other suitable type of storage component, or any combination thereof. Data storage means 104 can store, for example, media data (e.g., music and video files), application data (e.g., for implementing functions on electronic device 100), firmware, user preference information data, authentication information, lifestyle information data, wireless connection information data (e.g., information that can enable electronic device 100 to establish a wireless connection), contact information data (e.g., telephone numbers and email addresses), calendar information data, and any other suitable data or any combination thereof.

Motion detection circuitry 106 can include, for example, accelerometer circuitry (e.g. part number LIS302DL three axis digital output linear accelerometer made available by STMicroelectronics of Geneva, Switzerland) and/or gyroscope circuitry (e.g. part number L3G4200D three axis digital output gyroscope made available by STMicroelectronics of Geneva, Switzerland) for determining motion and/or relative position.

I/O circuitry 108 can be operative to convert (and encode/decode, if necessary) analog signals and other signals into digital data. In some embodiments, I/O circuitry 108 can also convert digital data into any other type of signal, and vice-versa. For example, I/O circuitry 108 can receive and convert physical contact inputs (e.g., from a multi-touch screen), physical movements (e.g., from a mouse and/or sensor), analog audio signals (e.g., from a microphone), or any other input. The digital data can be provided to and received from control circuitry 102, storage 104, memory 106, or any other component of the electronic device 100. Although I/O circuitry 108 is illustrated in FIG. 1 as a single component of electronic device 100, several instances of I/O circuitry 108 can be included in electronic device 100.

In some embodiments, electronic device 100 can include specialized output circuitry 108 associated with output devices such as, for example, one or more audio outputs. The audio output can include one or more speakers (e.g., mono or stereo speakers) built into electronic device 100, or an audio component that is remotely coupled to electronic device 100 (e.g., a headset, headphones or earbuds that can be coupled to communications device with a wire or wirelessly).

The user input interface 118 can include any suitable interface or component for allowing a user to provide inputs to I/O circuitry 108. Electronic device 100 can include any suitable input mechanism, such as a button, keypad, keyboard, dial, click wheel, or touch screen, for example. In some embodiments, electronic device 100 can include a capacitive sensing mechanism and/or a multi-touch capacitive sensing mechanism.

The display circuitry 120 can include a screen (e.g., an organic light emitting diode or liquid crystal display (LCD) screen) that is incorporated in electronics device 100. In some embodiments, the display circuitry can include a coder/decoder (Codec) to convert digital media data into analog signals. For example, the display circuitry (or other appropriate circuitry within electronic device 100) can include video Codecs, audio Codecs, or any other suitable type of Codec, and/or display driver circuitry. The display circuitry can be operative to display content (e.g., media playback information, application screens for applications implemented on the electronic device 100, information regarding ongoing communications operations, information regarding incoming communications requests, or device operation screens) under the direction of control circuitry 102. Alternatively, the display circuitry 120 can be operative to provide instructions to a remote display.

Communications circuitry 110 can include any suitable communications circuitry operative to connect to a communications network and to transmit communications (e.g., voice or data) from electronic device 100 to other devices within the communications network. Communications circuitry 110 can be operative to interface with the communications network using any suitable communications protocol such as, for example, Wi-Fi (e.g., a 802.11 protocol), Bluetooth®, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

In some embodiments, communications circuitry 110 can be operative to create a communications network using any suitable communications protocol. For example, communications circuitry 110 can create a short-range communications network using a short-range communications protocol to connect to other devices. For example, communications circuitry 110 can be operative to create a local communications network using the Bluetooth® protocol to couple electronic device 100 with a Bluetooth® headset.

Electronic device 100 can include one or more instances of communications circuitry 110 for simultaneously performing several communications operations using different communications networks, although only one is shown in FIG. 1, to avoid overcomplicating the drawing. For example, electronic device 100 can include a first instance of communications circuitry 110 for communicating over a cellular network, and a second instance of communications circuitry 110 for communicating over Wi-Fi or using Bluetooth®. In some embodiments, the same instance of communications circuitry 110 can be operative to provide for communications over several communications networks.

In some embodiments, electronic device 100 can be coupled to a host device (not shown) for data transfers, synching the communications device, software or firmware updates, providing performance information to a remote source or performing any other suitable operation that can require electronic device 100 to be coupled to a host device. Several electronic devices 100 can be coupled to a single host device using the host device as a server. Alternatively or additionally, electronic device 100 can be coupled to several host devices (e.g., for each of the plurality of the host devices to serve as a backup for data stored in electronic device 100).

In some embodiments, electronic device 100 includes UV meter circuitry 114 operative to receive ambient light and determine a property of the light representative of one or more of its UV components. The UV meter circuitry 114 can include a sensor (e.g. an aluminum gallium nitride (AlGaN) photodiode sensor) and associated circuitry operative to calculate the strength of UV solar radiation at one or more wavelengths.

In some embodiments, the electronic device 100 includes program instructions, configured to be stored in the data storage means 104, that, when implemented by the control circuitry 102, receive input from the user and/or communicate with the positioning system 112 to determine user coordinates and/or physical location. The program instructions are further configured to, using the physical location information, determine relevant UV data including UV index and communicate with the user input interface 118 to retrieve user profile data including, for example, environmental, sunscreen, skin type, medication, age, and management parameter data. Having received the relevant data, or at least a portion thereof, the system then uses the data to calculate a suggested/recommended amount of time that the user be exposed to the sun graphical displays the recommendation to the user using the display circuitry 120. In one embodiment, the system then initiates and graphically displays a countdown timer based on the calculated/displayed recommended exposure time and notifies the user when the timer has reached a specific time indicating that the user should change the level of sun exposure (such as by reapplication of sunscreen and/or rolling over, for example) or avoid exposure altogether. The operation of the program instructions are described in detail below.

Figures 2A, 2B:
FIG. 2A is an exemplary screenshot of one exemplary operation of the present invention.
FIG. 2B is an exemplary screenshot of one exemplary operation of the present invention.
Figure 3:
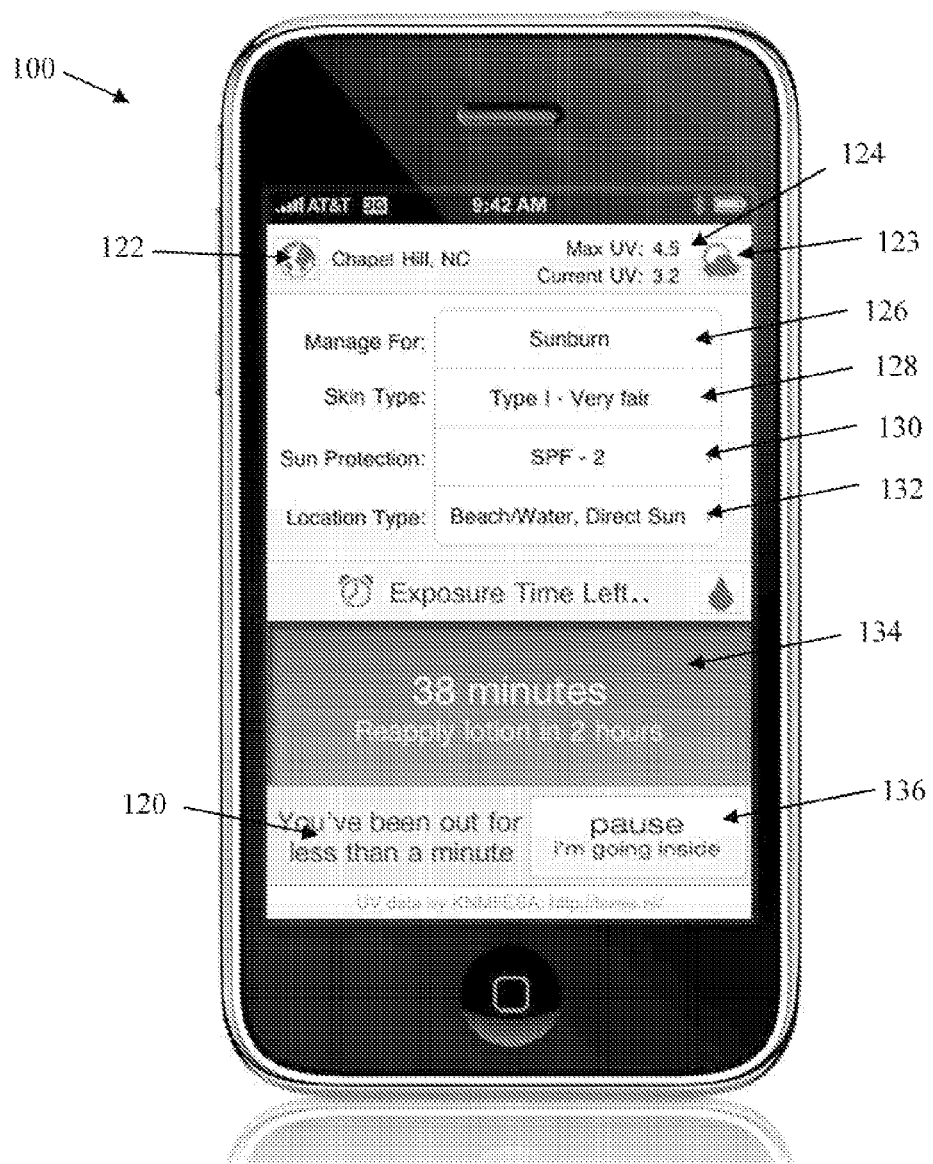
FIG. 3 is a is an exemplary screenshot of one exemplary operation of the present invention.

Referring to FIGS. 2-3, exemplary screenshots of some exemplary operations of the electronic device 100 are shown. In some embodiments, the system proceeds initially by receiving from the user and/or retrieving parameter data utilized by the system as user profile information. One such parameter is user location. In an embodiment in which the electronic device 100 includes a positioning system 112, such as a GPS system, the program instructions, when implemented by the control circuitry 102, are configured to communicate with the positioning system 112 to acquire coordinates of the user's location. Alternatively, the system can prompt the user to manually enter, using the user input interface 118, for example, a city and state and/or zip code, for example. Next, the system uses the user's location information to determine the UV index at that location. In an embodiment in which the electronic device 100 is network-enabled, the program instructions, when implemented by the control circuitry 102, are configured to communicate with the communications circuitry 110 to retrieve the UV index data from a server connected to the network such as the Internet. As one example, UV index data is provided over the Internet by the Royal Netherlands Meteorological Institute as retrieved from the scanning imaging absorption spectrometer for atmospheric cartography (SCIAMACHY) residing on the ENVISAT satellite launched by the European Space Agency. Alternatively, although less preferable, the UV index information could be fixed based on historical data and stored on the electronic device 100 or on a server in network communication with the device 100. Also alternatively, the user can be prompted to manually enter, using the user input interface 118, for example, the UV index at the current location.

In yet another embodiment in which the electronic device 100 includes UV meter circuitry 114, a UV sensor can measure the UVA and UVB values directly. Such an embodiment is particularly beneficial where location information is insufficient to provide accurate UV index data such as when the user is indoors and/or in an artificial tanning environment, such as a tanning bed. Absent such UV meter circuitry, it may be difficult to accurately identify the UVA/UVB emission due to the number of bulbs present, the proximity of the bulbs to the user, the time the user is exposed to the bulbs, the power level(s) supplied to each bulb and the age of each bulb.

Upon retrieving UV index data, the program instructions can communicate with the display circuitry 120 to display the UV index information to the user such as by UV display 124 which includes an approximation of the maximum expected UV index value and an approximation of the current UV index value at the location identified by location display 122. Optionally, the program instructions can be further configured to graphically display 123 the current weather and/or environmental attributes such as the cloudy conditions present at Chapel Hill, N.C. in the example shown in FIG. 3. The weather information 123 can also be retrieved by the electronic device 100 by communications circuitry 110 configured to access a network, such as the Internet, such as from the Royal Netherlands Meteorological Institute identified above or from the National Weather Service, for example.

While a recommended exposure time could be calculated using only UV index data, the resulting time value would be largely ineffective to assist a user in managing UV exposure for several reasons. One reason is that UV index data generally assumes that the sun is at its apex all day which is not accurate as the solar irradiance peaks around midday and is reduced toward the morning and evening hours. Accordingly, the system of the present invention is configured to consider the sun's motion across the sky when calculating exposure times as discussed further below.

Another factor relevant to exposure time calculation is the current environment (E). As shown in FIG. 2A, a screen 150a can be displayed to the user indicating various environmental parameter data and the user can interact with the electronic device 100a using the user input interface 118 to select relevant environmental attributes. Studies have indicated the following effects of UV radiation as dependent on environment: 85% increase from snow reflection; 100% increase at 3000 m altitude; 25% increase from white-water reflection; 80% of UV rays pass through clouds; 20% from sand and grass reflection (and 40% when wet); 15% reflection from concrete buildings; and 50% can be reflected into shaded areas. Exemplary attributes include indoors, shady spot, sunny spot, beach/water in shade, beach water in sun, snow, and mountains. In some embodiments, the program instructions are configured to add environmental parameter data selected by the user to the user profile information stored in the data storage means 104.

Another relevant factor in the calculation of recommended exposure time is the user's skin type (STF). As described above with respect to environmental factors, the user can interact with the electronic device 100b using the user input interface 118 to select the relevant skin type parameter as shown in FIG. 2B. A light skinned person (type 1-4) typically tends to burn when exposed to the sun and does not tan much, if at all. A medium skinned person (type 5) rarely burns, and tans quickly and noticeably when exposed to the sun. A dark skinned person (type 6) hardly ever burns and is dark skinned year round. In some embodiments, the program instructions are configured to add skin type parameter data selected by the user to the user profile information stored in the data storage means 104.

Another relevant factor effecting recommended exposure time is a user's age. The program instructions of the present invention are configured to consider the depletion of the ozone layer, such as by 4% per year as studies suggest, and accordingly reduce the recommended exposure for children under 10 accordingly, such as to 50% of a type 1 skin in order to account for an approximately 50% increase in UV radiation over a ten year period. Accordingly, the program instructions can be configured to display a prompt on the electronic device 100, using the display circuitry 120, wherein the user can identify his or her age using the user input interface 118 as described above with respect to environmental and skin type factors, and as shown in FIGS. 2A-2B. In some embodiments, the program instructions are configured to add age parameter data to the user profile information stored in the data storage means 104.

In combination with skin type, or separately, medical conditions such as rheumatoid arthritis, lupus or vitiligo and including those for which the user is currently receiving treatment in the form of medication, can be factored into the skin type parameter. In one embodiment, a database can be stored on the electronic device 100, or on a network-accessible server, including a list of medications and corresponding risk of increased sensitivity to UV radiation, if any. Accordingly, the program instructions can be configured to display a prompt on the electronic device 100, using the display circuitry 120, wherein the user can identify, using the user input interface 118, any medication and the electronic device 100 can indicate, based on a query communication to the database, whether it is known to cause increased sensitivity to UV light and, if so, what the appropriate skin type parameter value should be. Skin type parameters and their associated values are described further in Koolias, N., Malallah, Y. H., Al-Ajmi, H., Baqer, A., Johnson, B. E., Gonzalez, S., Erythema and Melanogensis Action Spectra in Heavily Pigmented Individuals as Compared to Fair-Skinned Caucasians, Photodermatology Photoimmunology and Photomedicine, vol. 12, no. 5, pp. 183-184, 1996 and Sayre et al., Skin Type, Minimal Erythema Dose (MED), J. Am. Acad. Dermatol. 5:439-443, 1981, incorporated herein by reference.

Another relevant factor accounted for by the system of the present invention can be the type of sunscreen used including sun protection factor (SPF). The system allows the user to minimize the negative effects of two different types of UV light: UVA and UVB. UVB is the type of radiation primarily associated with sunburns and secondarily with premature skin aging and skin cancer. The SPF value for a suntan lotion refers mainly to its ability to dissipate, absorb and/or reflect UVB rays or otherwise reduce their contact with skin cells. UVA light typically does not cause sunburns, but is mainly attributed to premature skin aging and skin cancer due to its ability to penetrate the skin deeper than UVB. The PFA and/or PPD value for a suntan lotion refers mainly to ability to reduce exposure to UVA rays. Accordingly, the program instructions can be configured to display a prompt on the electronic device 100, using the display circuitry 120, wherein the user can identify SPF, protection factor UVA (PFA) and/or persistent pigment darkening (PPD) parameter values, as appropriate, using the user input interface 118 as described above with respect to environmental and skin type factors, and as shown in FIGS. 2A-2B. In some embodiments, the program instructions are configured to add sunscreen parameter data to the user profile information stored in the data storage means 104.

While the parameters described above represent the preferred modality of the invention, other factors are contemplated such as preexisting medical conditions that may require more conservative or liberal exposure times, availability of sun tan lotion, reapplication, activities that wash off sun tan lotion, exposure of same or different portions of the body, percentage of body exposed, and acclimatization, among others.

Each unit of UV index has been found to be equivalent to 0.025 watts as determined by the World Health Organization using the McKinlay-Diffey Erythema action spectrum. Accordingly, Table 1 below shows several UV index values along with corresponding exposure values.

TABLE 1

| UV Index | Equivalent Exposure (Watts/m^2) |
|---|---|
| 1 | 2.50E−02 |
| 2 | 5.00E−02 |
| 3 | 7.50E−02 |
| 4 | 1.00E−01 |
| 5 | 1.25E−01 |
| 6 | 1.50E−01 |
| 7 | 1.75E−01 |
| 8 | 2.00E−01 |
| 9 | 2.25E−01 |
| 10 | 2.50E−01 |
| 11 | 2.75E−01 |

While other parameters are contemplated by the present invention, to calculate recommended exposure time using the exemplary parameters of GPS location and resulting UV index (UVI), time of day in minutes (TI), environment (E), skin type (STF), sunscreen SPF and/or PFA and/or PPD, and rollover factor (ROF), the program instructions can be configured to determine the actual UV exposure level at the current time (AUV) in Joules/m^2 as described by the Gaussian function:

$$AUV = a*(e\char`\^(-0.5*((TI/60)-b)^2/c^2))*UVI*E$$

where a equals 1.5, b equals approximately 12.008273642472979, c equals approximately 2.5150780598253322, e is the known constant Euler's number, and TI is the cumulative time of day in minutes.

From the AUV, the cumulative UV exposure for the day up to a certain time TI (CUV) can be calculated by the program instructions by successively adding the previous AUV values. To calculate the recommended exposure time (RET), the CUV at the time TI is compared according to the program instructions to the calculated total daily recommended UV exposure for the user (RUV) as discussed below. The UV exposure level to produce a minimal erythemal response (MED) in a person having the user's STF can be used as published by the World Health Organization (WHO), for example. Skin type parameter values can also take into account numerous studies in addition to WHO recommendations and the progressive depletion of the ozone layer of about 4% per year, particularly in the STF calculation for children under 10 years old. Attempting to equally expose different parts of the skin to the sun throughout the day, for example by rolling over at certain intervals, affords the user twice the amount of exposure time, for example.

Accordingly, in one embodiment, the program instructions are configured to calculate the RUV as the (MED)*(SPF or PFA)*STF*ROF. Because the UV index primarily measures UVB rays, and to a much lesser degree UVA rays, the system of the present invention includes program instructions configured to calculate the recommended exposure time based on a MED of 200 J/m^2. Accordingly, the system applies the principle that when the body starts to get red, it is signaling that it has had enough exposure and, whether also factoring the UVB/SPF and/or UVA/PFA values, the system uses the MED and UV index to provide a value representing a recommended time for the user to be exposed to the sun. The recommended exposure time can be displayed to the user in the form of a countdown timer 134 as shown in FIG. 3.

In one exemplary operation in which the current time is 10:00 AM (TI=600), the user has a skin type 2 (STF=2; MED=200 Joules/m^2), the user's sunscreen has a SPF/PFA protection value of 9, the UV index is 6 (UVI=6), the user is in the mountains (E=2) and the user is exposing the same area of skin during the session (ROF=1), the user can remain in the sun for 4.14 hours or until about 2:08 PM before a minimal erythemal response occurs. An RET of 4.14 is based on a user's entering the sun at the current time of 10:00 AM.

In another embodiment, the electronic device 100 is configured to display a prompt to the user, using the display circuitry 120, to enter the time of day that the user first became exposed to the sun, if different from the current time, and the RET can be calculated accordingly. The program instructions are configured to calculate the time value using known best fit or least squares linear regression methods, for example, to determine, given the calculated CUV, at what future time the CUV will equal the CUV at the current time plus the RUV which, in the example above, is 1800 (200*2*1). Alternatively, if the same person under the same conditions entered the sun on the same day at 3:00 PM, 15:00 hours (900 minutes) they could stay out all day before a minimal erythemal response occurred. The electronic device 100 can be configured to display an indication to the user that the user can remain exposed "all day" when the calculated recommended exposure time suggests that the user remain exposed past 6:00 PM, for example. Past this specified time, only a small fraction daily UV exposure remains and, in this exemplary embodiment, it is therefore deemed safe to stay outside without any known harmful effects. Accordingly, the suggested length of time a person may stay in the sun is based on what time of day the person enters the sun, the maximum suggested daily exposure, and the length of time it takes to accumulate the maximum suggested exposure.

The electronic device 100 of the present invention can also be configured to calculate the exposure time required to receive a healthy and recommended daily value (RDV) of vitamin D. Exemplary recommended vitamin D intake is generally 5 μg, or 200 IU (1 μg=40 IU) per day as shown in Table 2 below.

TABLE 2

Adequate Intake for Vitamin D Recommended (mcg/day (IU/day) by the Institute of Medicine

| Life Stage | Age | Males | Females |
| --- | --- | --- | --- |
| Infants | 0-6 months | 5 mcg (200 IU) | 5 mcg (200 IU) |
| Infants | 7-12 months | 5 mcg (200 IU) | 5 mcg (200 IU) |
| Children | 1-3 years | 5 mcg (200 IU) | 5 mcg (200 IU) |
| Children | 4-8 years | 5 mcg (200 IU) | 5 mcg (200 IU) |
| Children | 9-13 years | 5 mcg (200 IU) | 5 mcg (200 IU) |
| Adolescents | 14-18 years | 5 mcg (200 IU) | 5 mcg (200 IU) |
| Adults | 19-50 years | 5 mcg (200 IU) | 5 mcg (200 IU) |
| Adults | 51-70 years | 10 mcg (400 IU) | 10 mcg (400 IU) |
| Adults | 71 years and older | 15 mcg (600 IU) | 15 mcg (600 IU) |
| Pregnancy | all ages | — | 5 mcg (200 IU) |
| Breast-feeding | all ages | — | 5 mcg (200 IU) |

Table 2 indicates exemplary values that can be utilized by the program instructions of the electronic device 100. In the United States (U.S.), the 100% daily value used for product labels is 400 IU/day and typical diets provide about 100 IU/day. Although milk is usually fortified, the average daily consumption by most Americans is insufficient to obtain levels of vitamin D recommended by various medical authorities. While adequate intake has been defined as 200 IU/day for ages infant to 50, 400/day for 51-70, and 600/day over 70, the American Academy of Pediatrics has found that these recommendations are insufficient and recommends a minimum of 400 IU, even for infants. The NIH has set the safe upper limit at 2000 IU, but acknowledges newer data supporting a level as high as 10,000 IU/day.

Accordingly, the electronic device can be configured to display one or more prompts to the user, using the display circuitry 120, to input his or her age, gender, and percentage of body exposed to the sun, as well as other relevant parameter data, to determine recommended vitamin D intake. Using an exemplary recommended production of vitamin D of 1000 IU per day, the required exposure of a completely exposed body to UVB to produce 1000 IU is 20 J/m^2. For the previous example including an initial exposure time of 13:00 hours, the recommended exposure time would be 23.9 minutes. In order to produce the maximum amount of vitamin D for the day, 10,000 IU, the required exposure is 200 J/m^2 or the same exposure required for a MED. This relationship highlights the human body's self-regulating abilities. The skin sends color signals to the brain that the maximum health benefit level of vitamin D has been reached or if the body is partially clothed (10% equal to the hands and face) the color change in the skin signals the brain that a sufficient amount of sun exposure has been obtained. The electronic device 100 can be configured to communicate this relationship as an effective rule of thumb and added justification for the recommended exposure times.

In one exemplary operation of the present invention, the various parameters are determined or retrieved by the program instructions stored in the data storage means 104 of the electronic device 100 and/or entered by the user, include a current time of 1:00 pm (13 hours or 780 minutes), UV index of 2, medication associated with increased sun sensitivity and a resulting skin type factor of 0.25, associated MED of 200, SPF/PFA value of the user's sunscreen of 9, environment value of 2 indicating that the user is in the mountains without shade, and rollover factor of 1 indicating that the same area of the body will remain exposed throughout the session. Table 3 below shows optional and selected parameter values for this exemplary embodiment.

TABLE 3

| What time of Day is it? | | | Percent Body Exposed to Sun | | 100% | | |
| --- | --- | --- | --- | --- | --- | --- | --- |
| 13 | 0 | Military time | Equals | 780 | minutes into the day | | |
| Cumulative amount of exposure used for day: | | | | 1472 | Joules/M^2 | | |
| Total UV Exposure Suggested for the day: | | | | 450 | Joules/M^2 | | |
| Maximum Time in Sun Before Minimal Erythema: | | | | 1.53 | Hours | 92 | minutes |
| Sun Time for Min. Vit. D Prod. | | 1000 | IU | 0.6101 | Hours | 36.6 | minutes |
| Sun Time for Max Vit. D Prod. | | 10000 | IU | all day | Hours | all day | minutes |
| Rx | | drug-dependent | Medications Associated with Increased Sun Sensitivity MUST WEAR SUNGLASSES! | | | | |
| Children | | 0.325 | With Ozone depletion at 4% per year, extra care recommended | | | | |
| Type 1 | | 0.65 | Fair Skinned Caucasians who burn very easily and never tan 128 +/− 63 | | | | |
| Type 2 | | 1 | Light Skinned Caucasians who burn easily and tan slowly with difficulty 251 +/− 96 | | | | |
| Type 3 | | 1.25 | Medium Skinned Caucasians who burn rarely and tan relatively easily 351 +/− 103 | | | | |

TABLE 3-continued

| | | | |
|---|---|---|---|
| Type 4 | 1.75 | Darker Skinned Caucasians who virtually never burn and tan readily 467 +/− 122 | |
| Type 5 | 2.29 | Asian, Arab, or Indian Skin | |
| Type 6 | 5 | Afro-Caribbean or Black Skin | |
| SPF | 0-75 | Skin Type | .25 |
| PFA | 0-75 | Lotion Protection | 9 |
| Erythema | 200 | UV index | 2 |
| | | Environment | 2 |
| Expose only one side of body? | Yes = 1 | Roll Over | 1.0 |
| Rollover Exposure time x2 | | | |
| | | Percent Body Exposed to Sun | 100% |
| Near water no shade | 1.5 | | |
| Beach or Boat Under Umbrella | 0.5 | | |
| Park or Back yard no shade | 1.2 | | |
| Park or Back yard shade | 0.2 | | |
| Mountains no shade | 2 | | |
| Snow | 1.85 | | |

Figure 4:
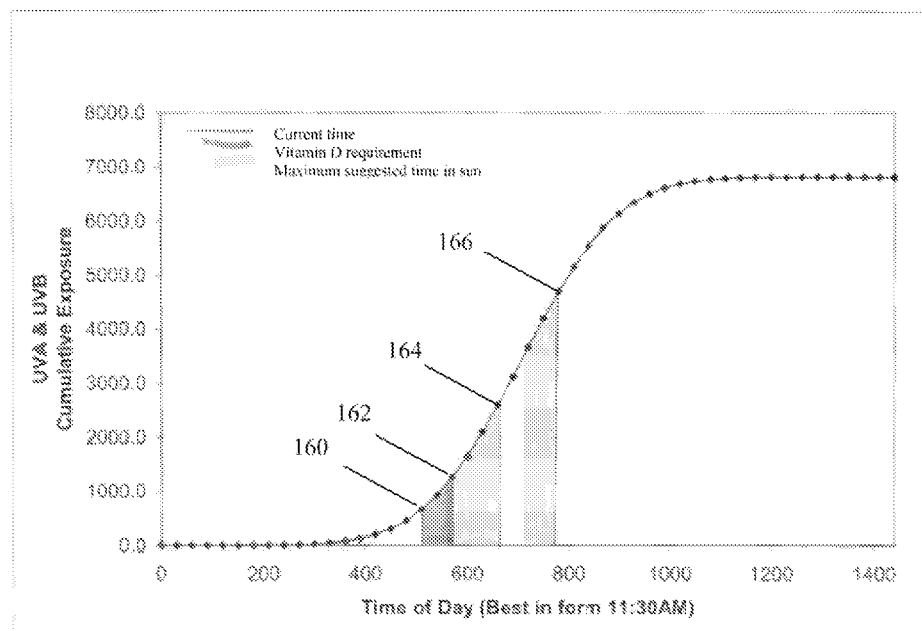
FIG. 4 is an exemplary graph identifying cumulative UV exposure over time.

FIG. 4 shows an exemplary calculation, as described in detail above, of recommended exposure times based on an initial exposure time 160 and current time 164, along with a graphical display of the integration of the CUV graph for a UV index of 6 required to determine RET 162, as well as recommended exposure time to receive an RDV 164.

Referring again to FIG. 3, upon determining a recommended exposure time for daily recommended value of UV and/or recommended exposure time for daily recommended value of vitamin D, the program instructions can be configured to display on the electronic device 100, using the display circuitry 120, a countdown timer 134 equal to one or both of the previously identified recommended exposure values. The program instructions can be further configured to display selected parameters, including, in the exemplary embodiment of FIG. 3, management type 126, skin type factor 128, sun protection value 130, and location information 132. One or more parameters can be displayed on the electronic device 100, using the display circuitry 120, in the form of an interface such that the user can modify a parameter value and the recommended exposure time(s) can be recalculated and redisplayed in response to such modification.

Upon initiation of the countdown timer 134, application can either remain on top in the user's screen or remain in the background, allowing the user to use another device 100 function such as listening to music, for example, until the timer 134 reaches a specified time in which the program instructions can be configured to notify the user, such as via a push function, for example, that the required exposure time to produce the minimal amount of vitamin D for the day has been reached and/or reminding the user that any further exposure to the sun is not medically warranted.

In some embodiments, the electronic device 100 can be further configured to alert the user, such as by text and/or voice, for example, when recommended exposure levels have been exceeded and reapplication of sun tan lotion and/or removal from the sun is required. The program instructions can further be configured to notify the user, using the display circuitry 120, that reapplication of sunscreen is required through the use of an advertisement by, for example, a sun tan lotion or lip balm manufacturer. The advertisements can be retrieved via the network interface and/or be installed on the electronic device 100, for example. The advertisements can consist of a graphical marketing display, a bar code useful as a coupon towards a future purchase, and/or a link to an advertiser's website, for example.

When using the electronic device 100, the user is likely to set the device 100 down and await the countdown timer's 134 alert and, accordingly, the device 100 may "sleep" or become inactive. In some embodiments, in order to check the status of the countdown timer 134, the device 100 can be configured to communicate with motion detection circuitry 106 to "wake" the device 100 in response to a user's shaking or moving the device 100. Alternatively, or in combination, the device 100 can be configured to communicate via voice commands to "wake" or "sleep," for example. Accordingly, transfer of oil and grease from the user's hands, particularly due to prior application of sun tan lotion, to the display screen and/or user input interface 118 can be avoided and/or reduced. Similar to the device's 100 response upon culmination of the countdown timer 134, upon display of the status, the program instructions can cause an advertisement to appear to the user. Should the user be using the electronic device 100 for other functions such as, for example, listening to music, the program instructions can be configured to return to the prior state upon further interaction by the user with the device 100.

In some embodiments, the device 100 can be configured to indicate on such a status check, or at any other time, the amount of UV rays received, such as in Joules/M^2 and also the amount of vitamin D received. Should the level of vitamin D be calculated to be below a previously established threshold amount, for example, the program instructions can cause an advertisement to be displayed on the device, using the display circuitry 120, which recommends a supplement marketed by the advertiser, for example. This function may be triggered by a cumulative time period of reduced sun exposure and with other qualifiers such as diet and intake of supplements and vitamins. Other products may be recommended such as UV blocking clothes, sunglasses, fade creams and the like. Other optional instructions, and a basis for advertisement, can include recommending the user open his or her mouth to expose the nasal passages and/or expose the ears to potentially beneficial UV rays capable of killing bacteria, viruses, mold, etc. that may be present in those areas.

In some embodiments, a cumulative alert may be linked to the amount of time the user has spent in the sun, optionally allowing the user to increment his or her skin type by 1 if minimizing sunburns is the main objective, for example.

In some embodiments, the program instructions can be configured to display on the electronic device 100, using the display circuitry 120, a pause interface 136, such that user interaction with the interface 136 suspends the application. In such embodiments, the program instructions can be configured to recalculate and display updated recommended exposure time(s) upon the user's subsequent interaction with the interface 136 and considering the previous exposure received by the using prior to suspension of the application.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for managing a user's exposure to ultraviolet radiation, comprising:
   a user input interface;
   display circuitry including a screen;
   control circuitry including at least one processor wherein the control circuitry is configured to communicate with the display circuitry and the user input interface;
   data storage means for storing program instructions that, when implemented by the control circuitry, are configured to:
   determine UV index information corresponding to a user's location;
   communicate with the user input interface to retrieve information for at least one user parameter, in which the at least one user parameter includes current time;
   calculate at least one recommended exposure time based on the UV index information and the user parameter information; and
   communicate with the display circuitry to display the recommended exposure time;
   the data storage means is further configured to store data representing a UV exposure level to produce a minimal erythemal response; and
   the program instructions are further configured to:
   calculate actual UV exposure level as a Gaussian function of the current time and the UV index;
   calculate the total daily recommended UV exposure; and
   calculate the number of minutes to receive the total daily recommended UV exposure based on the current time.

2. The system of claim 1 wherein the user parameter data is further selected from the group consisting of environmental, skin type, medication, age, management type, sunscreen protection, reapplication activity, percent of body exposed, acclimatization, and rollover.

3. The system of claim 2 wherein:
   the skin type parameter data is selected from the group consisting of light skin type 1, light skin type 2, light skin type 3, light skin type 4, medium skin, and dark skin;
   the environmental parameter data is selected from the group consisting of indoors, shade, bright sun, beach/water in shade, beach water in sun, snow, and mountains; and
   the sunscreen protection parameter data includes at least one factor selected from the group consisting of protection factor UVA, sun protection factor, and persistent pigment darkening.

4. The system of claim 1 further including communications circuitry configured to interface with a communications network to communicate with a remote electronic device and wherein the program instructions are further configured to:
   communicate with the user input interface to retrieve user geographic location; and
   determine the UV index information from the remote device based on the user geographic location information.

5. The system of claim 1 further including communications circuitry configured to interface with a communications network to communicate with a remote electronic device and a positioning system configured to determine geographic coordinates and wherein the program instructions are further configured to:
   determine the UV index information from the remote device based on the user geographic coordinates.

6. The system of claim 1 further including UV meter circuitry including a sensor and wherein the program instructions are configured to determine the UV index based on information retrieved from the sensor.

7. The system of claim 1 wherein the at least one recommended exposure time is selected from the group consisting of recommended exposure time for maximum recommended UV radiation and maximum suggested exposure time for recommended level of vitamin D.

8. The system of claim 1 wherein the program instructions are further configured to:
   display the recommended exposure time in the form of a countdown timer; and
   display a pause interface configured to suspend the countdown timer as selected by the user.

9. The system of claim 1 further including motion detection circuitry selected from the group consisting of an accelerometer and a gyroscope and wherein the system is configured to enter a sleep mode following a period of inactivity with one or more of the user input interfaces and the motion detection circuitry and wherein the program instructions are configured to exit the sleep mode following user interaction with the system as recorded by the motion detection circuitry.

10. The system of claim 1 wherein the program instructions are further configured to:
    notify the user when the at least one recommended exposure time is reached and wherein the notification selected from the group consisting of an audio signal, text signal, and vibration; and
    communicate with the display circuitry to display an advertisement.

11. A system for managing a user's exposure to ultraviolet radiation, comprising:
    a user input interface;
    display circuitry including a screen;
    control circuitry including at least one processor wherein the control circuitry is configured to communicate with the display circuitry and the user input interface;
    data storage means for storing program instructions that, when implemented by the control circuitry, are configured to:
    determine UV index information corresponding to a user's location;
    communicate with the user input interface to retrieve information for at least one user parameter, in which the at least one user parameter includes current time, age, and gender; calculate at least one recommended exposure time based on the UV index information and the user parameter information; and
    communicate with the display circuitry to display the recommended exposure time;
    wherein the data storage means is further configured to store at least one recommended daily vitamin D intake value; and
    wherein the program instructions are further configured to calculate the number of minutes to receive the total daily recommended vitamin D exposure based at least on the time, age, and gender, parameter data.

12. The system of claim 11 wherein the user parameter data is further selected from the group consisting of environmental, skin type, medication, age, management type, sunscreen protection, reapplication activity, percent of body exposed, acclimatization, and rollover.

13. The system of claim 12 wherein:
the skin type parameter data is selected from the group consisting of light skin type 1, light skin type 2, light skin type 3, light skin type 4, medium skin, and dark skin;
the environmental parameter data is selected from the group consisting of indoors, shade, bright sun, beach/water in shade, beach water in sun, snow, and mountains; and
the sunscreen protection parameter data includes at least one factor selected from the group consisting of protection factor UVA, sun protection factor, and persistent pigment darkening.

14. The system of claim 11 further including communications circuitry configured to interface with a communications network to communicate with a remote electronic device, and wherein the program instructions are further configured to:
communicate with the user input interface to retrieve user geographic location; and
determine the UV index information from the remote device based on the user geographic location information.

15. The system of claim 11 further including communications circuitry configured to interface with a communications network to communicate with a remote electronic device, and a positioning system configured to determine geographic coordinates, and wherein the program instructions are further configured to: determine the UV index information from the remote device based on the user geographic coordinates.

16. The system of claim 11 further including UV meter circuitry including a sensor and wherein the program instructions are configured to determine the UV index based on information retrieved from the sensor.

17. The system of claim 11 wherein the program instructions are further configured to:
display the recommended exposure time in the form of a countdown timer; and
display a pause interface configured to suspend the countdown timer as selected by the user.

18. The system of claim 11 wherein the program instructions are further configured to:
notify the user when the at least one recommended exposure time is reached and wherein the notification is selected from the group consisting of an audio signal, text signal, and vibration; and
communicate with the display circuitry to display an advertisement.

19. The system of claim 18 further including motion detection circuitry selected from the group consisting of an accelerometer and a gyroscope and wherein the system is configured to enter a sleep mode following a period of inactivity with one or more of the user input interfaces and the motion detection circuitry and wherein the program instructions are configured to exit the sleep mode following user interaction with the system as recorded by the motion detection circuitry.

* * * * *